Patented May 16, 1944

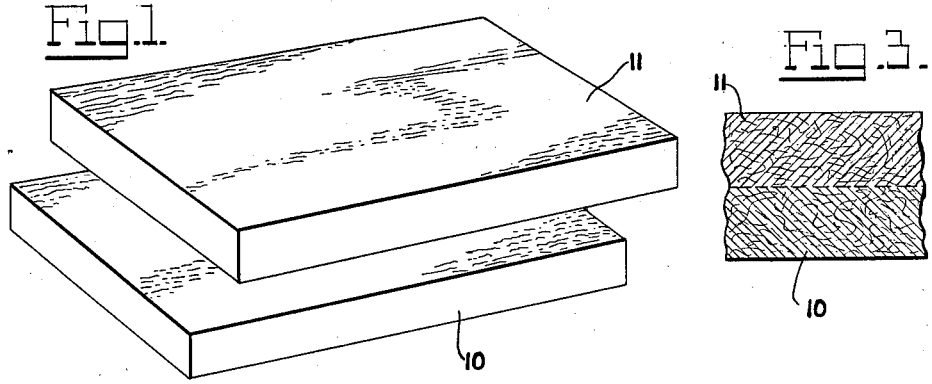
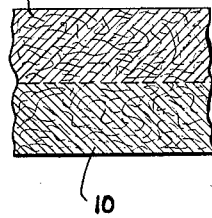
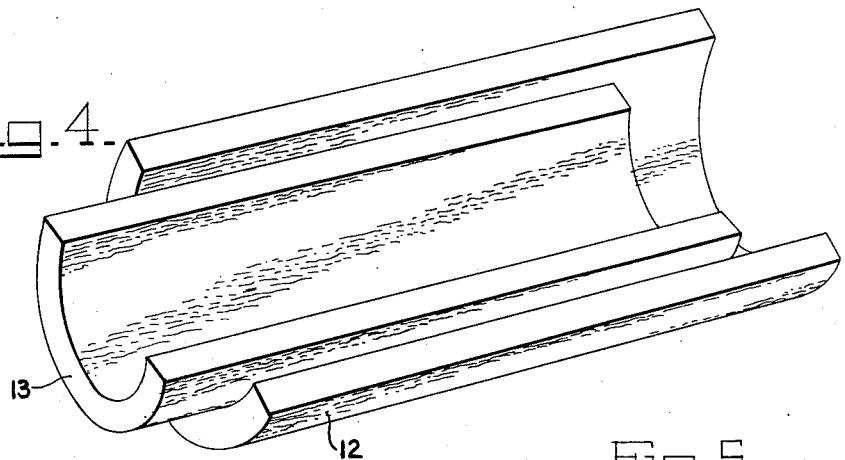
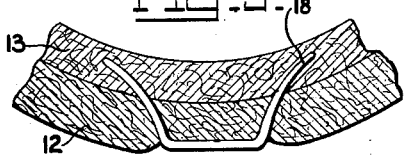
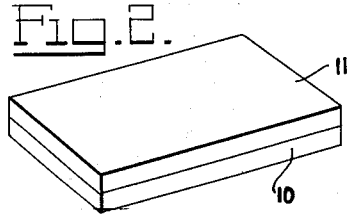
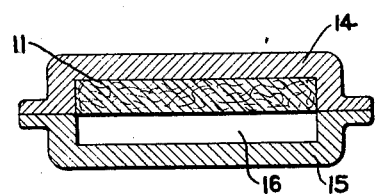

2,348,829

UNITED STATES PATENT OFFICE 2,348,829

MANUFACTURE OF HEAT INSULATION STRUCTURES

Roger A. MacArthur and Harold W. Greider, Wyoming, Ohio, assignors to The Philip Carey Manufacturing Company, a corporation of Ohio Application July 20, 1939, Serial No. 285,544

11 Claims. (Cl. 18—47.5)

This invention relates to the method of producing heat insulation structures. It relates especially to the method of producing preformed structures comprising formed bodies of heat insulation materials.

Heat insulation materials, because of their relatively low conductivity of heat, are used to decrease the transmission of heat energy by conduction or radiation either to or from a particular body. The use of heat insulation to cover boilers, steam- piping, etc., thus conserving fuel, is well known. No substance is perfectly efficient as a heat insulation material as all substances conduct heat to a certain extent. Certain materials are, however, more efficient than others. Also the efficiency of a particular material varies with the temperature at which it is used. Those materials having relatively low heat conductivity are known as heat insulation materials and are recognized as a class distinct from ordinary structural materials. Some heat insulation materials otherwise efficient cannot endure high temperatures and such materials are referred to as low temperature heat insulation materials. Those heat insulation materials which are adapted to resist relatively high temperatures are known as high temperature heat insulation materials.

It is a purpose of this invention to produce a heat insulation structure which is very high in heat insulation efficiency and which is adapted for use in insulating surfaces that require a high temperature heat insulation in order to withstand the temperature at which the surface to be protected is maintained.

It is a further purpose of this invention to manufacture a preformed structure of the high heat insulation efficiency referred to that can be installed very economically and that can be manufactured by economical production methods.

Heretofore heat insulations have been made by molding slabs of substantial thickness in the form of flat blocks, curved sections suitable for pipe coverings, and the like, from various compositions that can be formed to desired shape and dimensions and that contain heat insulating and heat-resistant ingredients. The compositions used are adapted to become bonded after formation to desired shape and dimensions so that they will have sufficient strength to stand up in use. One type of heat insulation material that has been extensively manufactured and used is that which is commonly referred to as "85% magnesia." 85% magnesia insulation has heretofore been produced by rapidly heating a 2 to 3% solution of magnesium bicarbonate to above about 200° F., to precipitate basic magnesium carbonate. The basic magnesium carbonate thus produced is then incorporated in a slurry, the solid components of which consist of about 85% of basic magnesium carbonate and about 15% of asbestos fiber. The slurry is molded in filter molds of desired shape under a pressure of about 15 to 40 pounds per square inch and the molded articles are thereafter dried and trimmed to desired dimensions. 85% magnesia insulation is suitable for insulating surfaces which are maintained at about 550° F., or less. If the insulation were to be used at temperatures above about 550 F., the basic magnesium carbonate would tend to decompose with resultant injury to the physical integrity of the insulation. Since 85% magnesia heat insulation material is very extensively used and is ill suited for use at temperatures above about 550° F., insulations of this type, namely, insulations which are particularly suited for use at temperatures below about 550° F., have become known as low temperature heat insulation materials. Heat insulation materials which are adapted for use at temperatures above about 550° F., are commonly referred to as high temperature heat insulation materials.

Heat insulation materials of the character referred to, both high and low temperature insulations, have been made heretofore in the form of molded slabs of substantially uniform characteristics throughout and the slabs such as blocks, pipe coverings and the like have been sold in separate units of standard dimensions for installation on the job.

It is a feature of the present invention that a preformed heat insulation structure appropriate for sale in the form of units of desired size and shape comprises at least two slabs of heat insulation material having different heat resistance characteristics and is manufactured by first making in any suitable way a slab of heat insulation material of desired dimensions and then molding an aqueous slurry in integral contact with the previously formed slab, which slurry is adapted to become set by chemical action to form another slab integrally bonded with the first slab in a composite heat insulation structure. The setting of the aqueous slurry by chemical action, may, for example, be the result of hydraulic setting after the manner of the setting of Portland cement, or may be the result of application of heat. Heat insulation compositions which can be set by chemical action as a result of heating or hydraulic action are advantageous since such compositions do not shrink to a substantial extent during drying. Such shrinkage, if it occurs, tends to impair the bond between the slabs and results in distortion of the desired dimensions of the composite insulation. Preferably the slurry, that is molded integrally with the slab first formed, comprises normal magnesium carbonate, and the slurry is adapted to become set by heating the molded slurry while moist to convert the normal magnesium carbonate therein to basic magnesium carbonate. When the slurry, that is integrally molded with a previously formed slab, contains normal magnesium carbonate, and such molded slurry is set by heating the slurry to convert the normal magnesium carbonate to basic magnesium carbonate, the juncture between the slabs is characterized by the cemented relationship of the basic magnesium carbonate thus formed in situ with the surface of the heat insulation material of the other slab and the manufacture of such products constitutes one of the objects and features of this invention. It is advantageous in the practice of this invention that the first formed slab of heat insulation material be formed by forcing an aqueous slurry of heat insulation ingredients into a filter mold with drainage of water from the mold, the material thus formed being removed from the mold, and dried and trimmed to desired dimensions before molding the second slab of heat insulation material integrally therewith. It is apparent from the foregoing that in the practice of this invention desirable unitary heat insulation structures are afforded wherein there are at least two layers or slabs that differ in heat resistance characteristics. One of the layers or slabs can be appropriate for use at low temperatures while the other is adapted for use at higher temperatures, each of the layers being permanently bonded to the other in the form of a preformed structural unit.

In order that a clear understanding may be had of this invention, it will be described hereinbelow in connection with certain specific embodiments thereof which are shown in the accompanying drawing, wherein Figure 1 is a perspective view of a preformed heat insulation structure according to this invention, the two layers of heat insulation material being offset relative to each other;

Figure 2 is a perspective view on a somewhat smaller scale of the preformed heat insulation structure wherein the two layers of heat insulation material are not offset;

Figure 3 is a transverse sectional elevation of a portion of the heat insulation material shown in Figs. 1 and 2;

Figure 4 is a perspective view of a heat insulation structure embodying this invention in a form suitable for a pipe covering with the two layers of heat insulation material offset relatively to each other;

Figure 5 is a transverse sectional elevation of a portion of a heat insulation structure showing supplementary means which may be used in a structure according to this invention for securing the layers of heat insulation material together; and Figure 6 is a horizontal sectional view of a mold which may be used in the manufacture of a heat insulation structure according to this invention.

In the embodiment of this invention shown in Figs. 1, 2 and 3 the heat insulation material comprises two layers or slabs of heat insulation material. These layers are indicated by the reference characters 10 and 11. The heat insulation characteristics of the layer 10 are substantially different from the heat insulation characteristics of the layer 11, as will be brought out more in detail below in connection with illustrative examples of heat insulation materials that may be used in these layers. The heat resistance of one of the layers is substantially greater than the heat resistance of the other layer. By heat resistance reference is made to the capacity of the heat insulation material to resist elevated temperatures without substantial decomposition or other change which results in excessive weakening of the molded heat insulation material. In this particular embodiment of this invention the layers 10 and 11 are integrally bonded with each other by virtue of the fact that one of the layers has been molded in contact with a surface of the other layer in a manner that will be described more in detail below.

In Fig. 1 the layer 10 is offset with reference to the layer 11 along two non-parallel edges, although the marginal dimensions of the two layers are the same. In other words, the structure is provided with complementary offset portions, both at the ends and at the sides. The structure shown in Fig. 2 is similar to the structure shown in Fig. 1, except that the layers 10 and 11 are not offset with respect to each other.

In the embodiment shown in Figs. 1, 2 and 3, the layers 11 and 12 may conveniently be about 1½ inches in thickness, for example. The length and width of the layers 10 and 11 may be of any desired dimension. When the length is about a foot or more, the offset at the ends shown in Fig. 1 may be conveniently about 1 or 2 inches. The offset along the sides may likewise be about 1 to 2 inches or somewhat less. It is apparent, however, that the thickness of the different layers and the dimensions of the component parts of the structure and the extent of overlap or offset, if any, of the layers may be varied as desired.

In Fig. 4 the insulation structure is curved so as to be appropriate for a pipe covering and is composed of two layers 12 and 13 of heat insulation material. The heat insulation characteristics of the layer 13 differ from the heat insulation characteristics of the layer 12, as will be referred to more in detail below. The structure shown in Fig. 4 may be of any desired dimensions. For fitting snugly about a 3 inch pipe, for example, the layer 13 may conveniently be about 1 inch in thickness and the layer 15 may conveniently be about 1½ inches in thickness. In a pipe covering of these dimensions the offset of the layers 12 and 13 may be about ¼ to ½ inch along the sides and about 1 to 2 inches at the ends. Insulation structures suitable for pipe coverings may, of course, be made with no offset whatever. Moreover, insulation structures of other shapes, either flat or curved and of any desired size and dimensions may be made embodying this invention.

In order to illustrate one embodiment of this invention, the constituents of the component parts thereof will be described in connection with an illustrative example of a method of manufacturing a heat insulation structure according to this invention. A formed layer or slab of a heat insulation material especially appropriate for resisting high temperatures, that is, temperatures such as about 550° F., to about 1200° F., may be made as described in U. S. Patent No. 2,042,096 issued May 26, 1936. According to one modification described in this patent, an aqueous slurry is made containing as solids about 30% of basic magnesium carbonate, about 45% of calcium carbonate, about 7.5% of asbestos fiber, about 7.5% of Amphibole fiber, about 5.5% of bentonite clay, about .05% of hydrated lime, about 3% of diatomaceous earth and the balance inert material such as color, impurities, etc. The basic magnesium carbonate is formed by rapidly heating a 2 or 3% solution of magnesium carbonate to above about 200° F. The calcium carbonate is precipitated by treating a calcium hydroxide suspension with carbon dioxide. The slurry containing the ingredients above mentioned is molded in a filter mold under a pressure of about 50 pounds per square inch to form a molded article which after molding is dried. The molded article may correspond with the slab 11 shown in Figs. 1, 2 or 3 or the slab 13 shown in Fig. 4. After drying, the formed slab is trimmed so as to be of the dimensions desired for the completed structure.

The slab of high temperature heat insulation material which is of the desired shape and dimensions is placed in a mold which is larger than the slab of high temperature heat insulation material that is inserted therein and which is suitable for molding a low temperature heat insulation integrally with one side of the slab of high temperature heat insulation. For example, in making a structure such as that shown in Fig. 2, a simple mold such as the mold shown in Fig. 6 may be used. The mold may be made in two parts 14 and 15 that are adapted to be detachably secured together by any suitable means, not shown. The mold is adapted to receive the previously formed slab 11 of high temperature heat insulation composition. The low temperature heat insulation composition is then introduced into the vacant portion 16 of the mold thereby molding the low temperature heat insulation composition integrally with the previously formed slab of high temperature heat insulation material. The layer thus molded is the layer 10 shown in Figs. 1, 2 and 3.

One preferred type of low temperature heat insulation for employment in combination with a high temperature heat insulation material according to this invention may be made by preparing an aqueous slurry containing as solids about 89% of finely-divided normal magnesium carbonate crystals and about 11% of asbestos fiber. This slurry is poured into the mold in a semi-fluid condition, there being present about 3.5 parts of water to each part of solids. The heat insulation material, after being molded in contact with a surface of the previously formed slab of high temperature heat insulation material can be set merely by heating the molded composition containing normal magnesium carbonate crystals to a temperature above about 160° F., and preferably to about 185° F. or more, to convert the normal magnesium carbonate crystals to basic magnesium carbonate. The resulting heat insulation material molded integrally with the previously formed high temperature heat insulation material is a low temperature heat insulation corresponding to the 85% magnesia insulation hereinabove referred to and has high thermal heat insulating efficiency at temperatures below about 550° F. The formation of the 85% magnesia insulation material from a slurry containing normal magnesium carbonate crystals is to be preferred to forming the basic magnesium carbonate prior to molding, inasmuch as a composition containing normal magnesium carbonate can be set by heat and dried without substantial shrinkage of the molded material. Moreover, such a mass will harden to form a slab having adequate strength for most purposes even though no molding pressure is used and even though the composition is not molded in a filter mold. One can, of course, in the practice of this invention, use a filter mold in molding the low temperature heat insulation composition especially when an excess of water is present and the molding may be under pressure.

In the manner above described a low temperature heat insulation material having desired dimensions for the finished heat insulation structure can be molded without necessarily resorting to pressure molding and without deformation or weakening of the bond between the two types of heat insulation material that would tend to result if a low temperature heat insulation composition were used that shrinks or warps during drying. Low temperature heat insulation materials made from aqueous slurries containing a major proportion of finely-divided normal magnesium carbonate have preferred characteristics for use according to this invention, both from the point of view of the method of manufacture and from the point of view of the finished product.

When the composite structure is to be used as a pipe covering, the inner layer or slab 13 ordinarily is of high temperature heat insulation material and is formed first. Thereafter the layer 12 of low temperature heat insulation is integrally molded with the outer surface of the layer 13.

In making a composite heat insulation structure embodying this invention, various other heat insulation materials than those above described for purposes of exemplification may be used. For example, instead of the high temperature heat insulation material described above, the heat insulation may be made consisting primarily of porous silica. The silica can be bonded together either by heat in the presence of a suitable flux or by means of a binder. In such case it is preferable to make the porous silica block and then mold the low temperature insulation integrally with one surface of the porous silica block.

In the practice of this invention, it is preferable to first form the high temperature heat insulation material and thereafter mold the low temperature heat insulation material integrally therewith. However, it is possible to first form the low temperature heat insulation material and thereafter mold the high temperature heat insulation material integrally therewith. For example, a block or slab of ordinary 85% magnesia insulation may be made in the manner hereinabove described using basic magnesium carbonate precipitated from a magnesium bicarbonate solution, the insulation being molded in a filter mold under pressure with expulsion of water and thereafter dried and trimmed. After the block or slab of low temperature heat insulation material of desired dimensions has been made, a high temperature heat insulation material can be molded integrally with one surface of the low temperature heat insulation material. For this purpose the high temperature heat insulation material may be made according to the method described in our application Ser. No. 283,066, filed July 6, 1939, for Manufacture of heat insulation material and composition therefor and resulting product, executed on even date herewith and on which Patent No. 2,262,935 issued November 18, 1941. The insulation may, for example, be molded from an aqueous slurry containing as solids about 45 parts of normal magnesium carbonate, about 42 parts of calcium carbonate, and 13 parts of asbestos fiber and containing sufficient water to enable the slurry to readily flow into the mold. After the slurry has been molded integrally with the previously-formed slab or block of low temperature heat insulation material, the molded high temperature heat insulation composition can be hardened or set by heating the composite structure, while the molded high temperature heat insulation composition is moist, to above about 160° F., and preferably to about 185° F. (or above), to convert the normal magnesium carbonate to basic magnesium carbonate. The heat insulation thus prepared is suitable for resisting higher temperatures than the temperatures which can be resisted by the 85% magnesia insulation forming part of the structure. The structure as a whole is suitable for use when the high temperature insulation layer of the composite structure is placed in contact with a surface maintained at temperatures ranging from about 550° F., to about 1200° F.

The advantage of a structure such as that above described is believed to be apparent. When the composite structure is positioned on a surface to be insulated, which surface is to be maintained at a temperature of about 550° F., to about 1200° F., the high temperature insulation layer of the composite structure is placed in closest proximity to the surface and the layer of low temperature insulation material is on the outside. The low temperature insulation of the outer layer has greater heat insulation efficiency at lower temperatures than does the high temperature insulation of the inner layer. Moreover, since the inner layer of high temperature insulation protects the outer layer of low temperature insulation, the outer layer of low temperature insulation can be composed of materials which are not as resistant to impairment by heat as are the ingredients of the high temperature insulation of the inner layer. In this way a product is afforded which has a maximum degree of heat insulation efficiency while at the same time being adapted to resist the heat to which the component parts of the structure are subjected in service.

A product having the high degree of heat insulation efficiency above referred to can be installed in a very economical manner. In order to achieve an equally high heat insulation efficiency using heat insulation materials at the present time on the market, it would be necessary to make high temperature heat insulation shapes and to separately make low temperature heat insulation shapes and first install the high temperature heat insulation and follow such insulation by a second installation of an overlying layer of low temperature heat insulation. The composite structure of this invention can, on the other hand, be installed in a single operation and the installation cost is, therefore, very greatly reduced.

As mentioned hereinabove, it is preferable to make a heat insulation structure embodying this invention by first forming one slab or block of heat insulation material of a first type and then mold integrally therewith a second block or slab of heat insulation material of another type. When this is the case it is distinctly preferable in the practice of this invention that the slab or shape which is last formed be made from a moldable composition that is of the heat-setting type, namely, an insulation that is first molded and then set by heating, or that is adapted to set hydraulically. Heat insulation compositions which are adapted to be set by heating or which are adapted to become set hydraulically do not shrink or warp appreciably during setting and drying and do not tend to disrupt the bond between the two layers of heat insulation material during setting and drying.

Hereinabove, a low temperature heat insulation composition has been described that is adapted to set upon application of heat. A low temperature heat insulation composition that sets hydraulically may be made, using a mixture of gypsum and diatomaceous earth. For example, an insulation composition may be made up in the form of an aqueous slurry containing as solids about 75% of diatomaceous earth and about 25% of gypsum. The slurry thus made will set hydraulically and may be used as the low temperature heat insulation of a composite structure embodying this invention.

If the shape or slab of the composite structure which is first made is a low temperature heat insulation material, this portion of the structure may be made, using mineral wool together with some suitable binder such as starch, sodium silicate, asphalt or clay. Such a low temperature heat insulation may be made up containing a major proportion of mineral wool and a minor proportion of binder and then molded under slight pressure and dried.

When the low temperature heat insulation material is formed first, a hydraulically setting high temperature heat insulation material may be used therewith, such as a mixture containing about 25% Portland cement, about 70% diatomaceous earth, and about 5% of asbestos fiber. The mixture may be made up as a typical aqueous cement mix or slurry and then molded integrally with the previously formed block or slab of low temperature heat insulation material.

Another composition which is especially suitable for high temperature heat insulation and which sets hydraulically may be made up by using about 50% of diatomaceous earth, about 40% of a high alumina fused hydraulic cement such as "Lumnite," and about 10% of an asbestos fiber.

Exfoliated mica may be used in the low temperature heat insulation component of the structure as by using it with a suitable proportion of Portland cement binder. A mixture containing about 30% of exfoliated mica, about 10% of asbestos fiber, and about 60% of Portland cement, is suitable.

Another example of a high temperature insulation material which is adapted to be set by heating consists principally of a mixture of calcium oxide and calcined diatomaceous earth. For example, a material containing about 30% of calcium oxide, about 65% of calcined diatomaceous earth and about 5% of asbestos fiber may be molded in the form of a semi-plastic slurry. Upon heating the mold under steam pressure in a closed chamber the lime reacts with the diatomaceous earth to form calcium silicate which acts as a bonding agent for the insulation material.

While several examples of heat insulation materials have been mentioned which are adapted to set either by heating or hydraulically, it is not essential that these materials be molded integrally with another layer of heat insulation material previously formed. Any of these insulations may constitute the layer which is formed initially.

As shown in Figs. 1 and 4, it is usually preferable to have the layers or slabs of different heat insulation materials offset relatively to each other. When the units of the heat insulated structure are constructed in this manner, they can be installed in such a way as to minimize the occurrence of cracks extending from the outside of the insulation structure through the insulation to the surface to be protected. Moreover, the overlapping or offsetting of the layers assists in maintaining the units of the composite structure in place after they are installed. When curved insulation units are made, e. g., as shown in Fig. 4, and the layers or slabs of insulation materials are offset relatively to each other along the side edges thereof, it is preferable to construct the insulation so that the surfaces of the layers adapted for complementary positioning with another similarly-formed insulation unit will be straight rather than curved throughout the portions thereof that extend beyond the diameter of the insulation that approximately bisects the offset portions of layers.

When it is desired to bond the layers or slabs of heat insulation material very strongly to each other, one of the layers can be formed first and mechanical securing means may be driven therethrough so as to extend from the opposite side. Thereafter, the other layer of the composite structure is molded so as to surround the ends of the securing means protruding from the slab or layer first formed and so as to be molded integrally with the surface of the slab or layer first formed. In this way a very strong and permanent bonding between the two layers or slabs of the composite structure can be obtained. Thus, in making a structure such as that shown in Fig. 4, the slab 12 may be formed and staples 18 driven therethrough, the ends of which become embedded in the slab 13, as shown in Fig. 5, when the slab 13 is molded integrally with slab 12.

While this invention has been described in connection with certain specific embodiments thereof, it is to be understood that this has been done merely for the purpose of exemplification and that insulations embodying our inventive idea may be varied widely without departing from the scope of this invention as defined by the language of the following claims.

We claim:

1. A method of making a heat insulation which comprises making a slab of high temperature heat insulation material in a filter mold by forcing an aqueous slurry of solid heat-insulation ingredients into the mold with drainage of water from the mold, removing the formed slab from the filter mold, then trimming and drying said slab, making an aqueous slurry comprising normal magnesium carbonate and mineral fibres, molding said slurry in the form of a slab in integral contact with one surface of said slab of high temperature heat insulation material and then heating the resulting composite structure to convert said normal magnesium carbonate to basic magnesium carbonate, thereby forming a composite heat insulation comprising a slab of low temperature heat-insulation material integral with a slab of high temperature heat-insulation material.

2. A method of making a heat insulation structure which comprises making a slab of heat insulation material in a filter mold by forcing an aqueous slurry of solid heat-insulation ingredients into the mold with drainage of water from the mold, removing the formed slab from the filter mold, then drying and trimming said slab, then molding in integral contact with a surface of said heat insulation material and in the form of a slab an aqueous slurry comprising normal magnesium carbonate and a filler, and then heating the composite structure while said molded slurry is moist to convert said normal magnesium carbonate to basic magnesium carbonate.

3. A method of making a heat insulation which comprises making a slab of heat insulation material which slab is of the predetermined ultimate dimensions desired in the heat-insulation product and is of substantial strength, making an aqueous slurry comprising heat insulation ingredients, said slurry being adapted to become set by chemical action to a rigid mass, molding said slurry in integral contact with a surface of said slab of heat insulation material, said slurry thereafter setting and being dried to form a composite heat insulation comprising two integrally united slabs of heat insulation material having different heat resistance characteristics.

4. A method according to claim 3 wherein said slurry is adapted to set hydraulically and after molding becomes hydraulically set.

5. A method according to claim 3 wherein said slurry is adapted to set upon being heated and after molding is set by application of heat.

6. A method according to claim 3 wherein the slab of heat insulation material that is first made is made in a filter mold by forcing an aqueous slurry of solid heat-insulation ingredients into the mold with drainage of water from the mold and is removed from the mold, dried, and trimmed to the desired predetermined dimensions before molding said slurry in integral contact therewith.

7. A method, according to claim 3, wherein said first-formed slab has mechanical securing means embedded therein and protruding from a face thereof, and said other slab is molded in integral contact with said face, thereby causing said mechanical securing means protruding from said first slab to become embedded in said second slab.

8. A method, according to claim 3, wherein the slab molded from said slurry is molded integrally with the other slab in offset relation thereto.

9. A method of making a heat insulation which comprises making a first slab of heat-insulation material in a filter mold by forcing an aqueous slurry of solid heat-insulation ingredients into the mold with drainage of water from the mold, removing said slab from the mold, drying the slab, and trimming said slab to desired dimensions, making a slurry comprising heat-insulation ingredients, said slurry being adapted to become set by chemical action to a rigid mass, molding said slurry in integral contact with a surface of said dried and trimmed first slab in the form of a second slab integral therewith, said slurry thereafter setting and being dried, thereby forming a composite heat-insulation material comprising two integrally-bonded slabs of heat-insulation material having different heat-resistance characteristics.

10. As an article of manufacture, a preformed heat-insulation structure comprising a first slab of heat insulation material deficient in resistance to temperatures above 550° F. and integrally joined face to face therewith, a second slab of heat insulation material resistant to temperatures substantially above 550° F., at least one of said slabs containing a major proportion by weight of basic magnesium carbonate and being rigidly set with the particles of said basic magnesium carbonate that constitute the major proportion by weight of said slab in the interbonded relationship that results from the production of said basic magnesium carbonate by in situ decomposition of normal magnesium carbonate to form said basic magnesium carbonate and the juncture between said slabs being characterized by the cemented relationship of the basic magnesium carbonate at the surface of the slab containing a major proportion by weight of basic magnesium carbonate with the surface of the heat insulation material of the other slab, which cemented relationship results from said in situ decomposition of the normal magnesium carbonate intimately contacting the material of said other slab at said juncture.

11. As an article of manufacture, a preformed heat-insulation structure comprising a first slab of heat insulation material and integrally joined face to face therewith, a second slab of heat insulation material having substantially different heat-resistance characteristics from said first slab, at least one of said slabs containing basic magnesium carbonate and being rigidly set with the particles of said basic magnesium carbonate in the interbonded relationship that results from the production of said basic magnesium carbonate by in situ decomposition of normal magnesium carbonate to form said basic magnesium carbonate, and the juncture between said slabs being characterized by the cemented relationship of the basic magnesium carbonate in the slab containing the same with the surface of the heat insulation material of the other slab, which cemented relationship results from said in situ decomposition of normal magnesium carbonate intimately contacting the material of said other slab at said juncture.

ROGER A. MacARTHUR.
HAROLD W. GREIDER.